Feb. 28, 1961  R. ANTRAIGUE  2,973,225
BALANCING WEIGHT ARRANGEMENT FOR A MOTOR-VEHICLE WHEEL
Filed Feb. 10, 1959  4 Sheets-Sheet 1
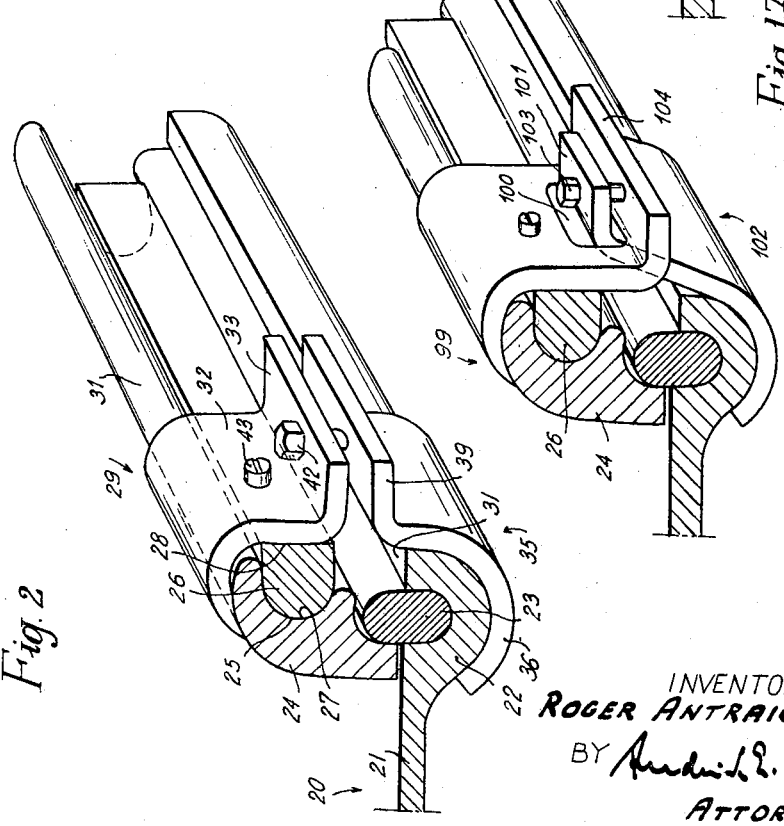
INVENTOR
ROGER ANTRAIGUE
BY
ATTORNEY

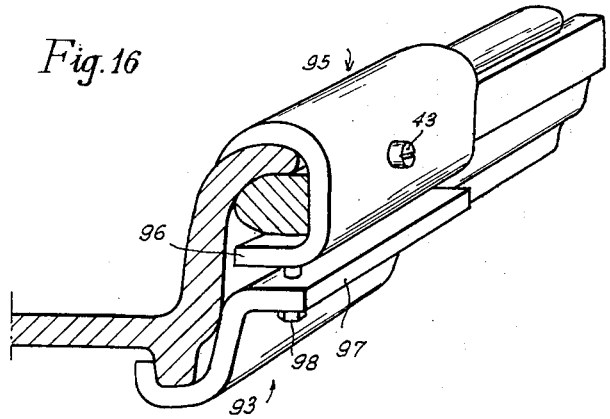
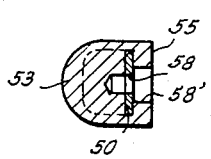
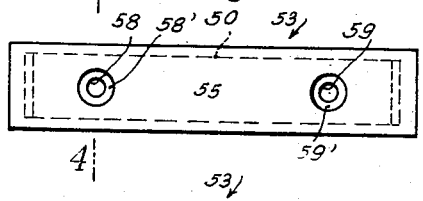
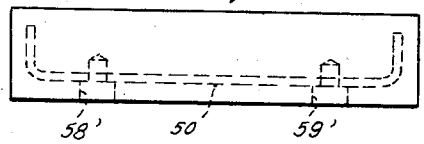
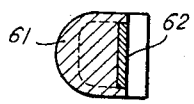
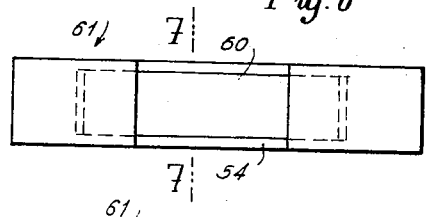
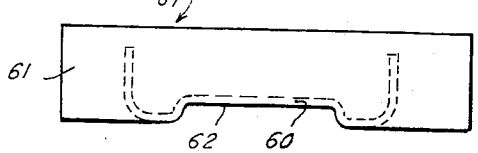
INVENTOR
ROGER ANTRAIGUE Feb. 28, 1961 R. ANTRAIGUE 2,973,225
BALANCING WEIGHT ARRANGEMENT FOR A MOTOR-VEHICLE WHEEL
Filed Feb. 10, 1959 4 Sheets-Sheet 3

INVENTOR
ROGER ANTRAIGUE
BY
ATTORNEY

Feb. 28, 1961  R. ANTRAIGUE  2,973,225
BALANCING WEIGHT ARRANGEMENT FOR A MOTOR-VEHICLE WHEEL
Filed Feb. 10, 1959  4 Sheets-Sheet 4
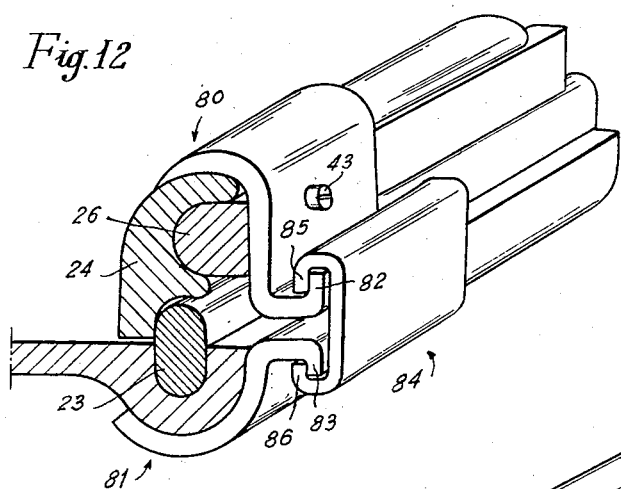
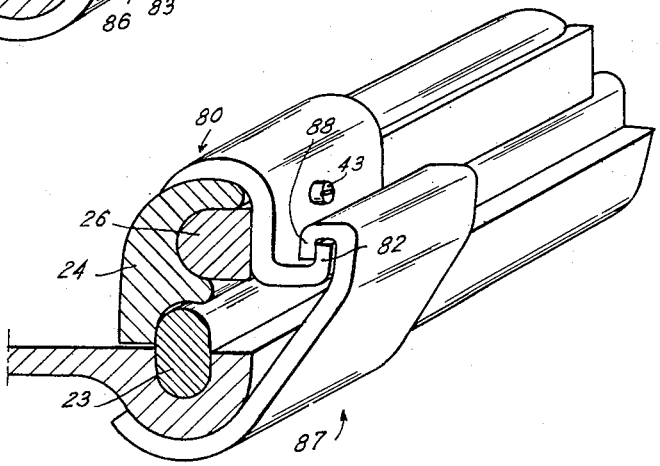
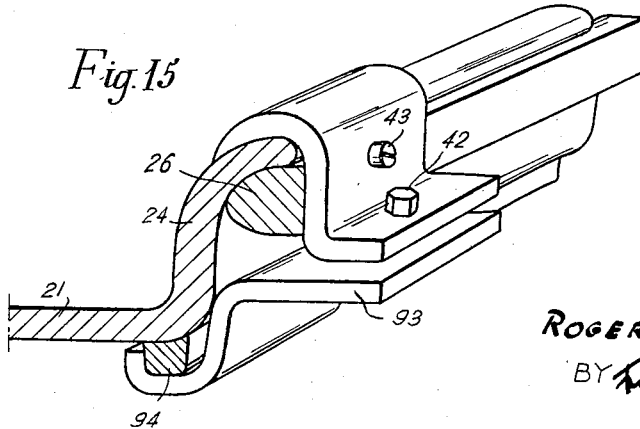
INVENTOR
ROGER ANTRAIGUE
BY Frederick E. Hane
ATTORNEY

United States Patent Office 2,973,225
Patented Feb. 28, 1961

2,973,225

BALANCING WEIGHT ARRANGEMENT FOR A MOTOR-VEHICLE WHEEL

Roger Antraigue, 202 Quai de Jemmapes, Paris 10, France

Filed Feb. 10, 1959, Ser. No. 792,424

Claims priority, application France Feb. 21, 1958

16 Claims. (Cl. 301—5)

This invention relates to balancing weights or masses for the wheels of motor vehicles, and an important one of its objects is to provide improved means for retaining the weight or mass on the wheel. The invention is more especially designed for use with vehicle wheels of the type wherein the wheel rim is formed with an external rib at the junction between the peripheral flange of said rim and the body thereof. According to a feature of the invention, clamping means are provided which engage both said peripheral flange and said rib of the rim and forcibly hold the balance weight against the outer face of the flange.

The arrangement of the invention is especially applicable to wheels of trucks and other heavy-duty vehicles wherein the wheel rim is formed with an annular projection or rib defining an annular recess receiving a backing ring for maintaining a tire to the wheel.

The clamping means according to the invention may be provided in one or more parts. If provided in a single part, then such part is made substantially resilient so as to be elastically deformable and permit placing the device in position. If provided in two or more parts, then means are provided, such as a screw-and-nut system, for forcing the two jaws towards and apart from each other.

Conveniently, the balancing weight is in the form of a band adapted to be received between the outer contour of the rim and the clamping means, and has a supporting face adapted to be moved into pressure engagement with the rim by the action of the clamping means.

Means are further provided for blocking the mass with respect to the clamping means with which it is in engagement. In this connection, the invention may provide a particular construction of a balancing weight to facilitate such blocking action.

In the ensuing description, given by way of example but not of limitation, reference will be made to the accompanying drawings wherein:

Fig. 1 is a transverse cross section relating to a first embodiment;

Fig. 2 is a perspective view of part of a wheel rim equipped with the device of the invention and shown in cross section;

Fig. 3 is a front view of a balancing weight construction according to the invention;

Fig. 4 is a section on line 4—4 of Fig. 3;

Fig. 5 is a plan view of the weight shown in Fig. 3;

Fig. 6 is similar to Fig. 3 but relates to a modification;

Fig. 7 is a section on line 7—7 of Fig. 6;

Fig. 8 is a plan view corresponding to Fig. 6;

Fig. 9 is a view similar to Fig. 2 relating to a modification;

Fig. 12 is a similar view of yet another modification;

Fig. 13 is a similar view of yet a further modification;

Figure 14:
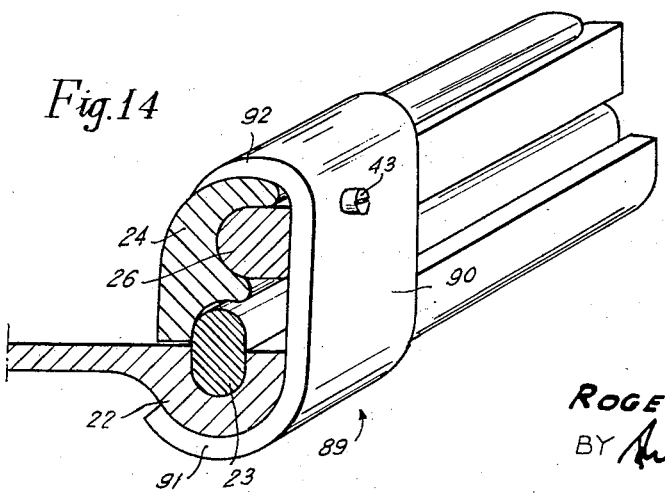

Fig. 14 similarly shows another modification;

Fig. 15 illustrates another modified construction;

Fig. 16 shows a modification of the embodiment of Fig. 15; and

Fig. 17 is similar to the preceding views but relates to a further modification.

First referring to Figs. 1 and 2, a wheel rim 20 includes the rim body 21 and a peripheral rib 22 which defines an annular recess in which is received a backing ring 23 serving to lock in position the conventional annular tire supporting rim flange 24. The tire supporting flange 24 is formed with a groove 25 in which a balancing mass or weight 26 is received. This weight is in the form of a band having a convex face 27 narrowly fitting into the contour of the groove 25 and a flat face 28. The weight may be made of lead or lead alloy. The clamping means therefor comprises an upper clamp 29 the internal surface 30 of which engages the outer surface 31 of the flange 24. Clamp 29 further includes a substantially flat portion 32 continued a protruding edge 33 formed with a hole 34. The other clamp 35 of the clamping means includes an arcuate portion 36 the inner contour of which conforms with the outer contour 37 of the rib 22 as far as the limit 38 of the latter, and extends therebeyond in the form of a protruding edge 39 adjacent the edge 33. The edge 39 is formed with a threaded hole 40, and another threaded hole 41 is formed in the portion 32 as shown.

After the balance weight has been mounted in position within the groove 25, the clamp 29 is shifted to overlie the weight and is then forced towards the other clamp 35 by means of a screw 42 extending through hole 34 and threaded into hole 40. As the screw is forced home the portion 32 tends to rock inwards and engages under increasing pressure against the flat face 28 of the weight so as to force the weight into the bottom of the groove 25, with an outer portion of said weight protruding somewhat out of the groove. Further to lock the weight in position, a screw 43 is threaded into the hole 41 and turned to force the sharp tip of the screw into the comparatively soft metal out of which the weight 26 is made.

When no longer required, the clamps 29 and 35 and the weight 26 can be removed by simply unscrewing the screws 42 and 43.

The balance weight may be provided in the form of a simple strip or band of lead or other heavy alloy of appropriate cross section. Preferably however, the invention utilizes a balance weight of the type shown in Figs. 3 to 5 or that shown in Figs. 6 to 8.

In the form of the embodiment shown in Figs. 3 to 5, the weight assembly 53 comprises an inner strip or band of metal 50 having perforations 58 and 59 near its opposite ends, and the main body of the balance weight is formed with registering perforations 58' and 59' respectively, opening into the flat outer face 55.

The screw 43 thus acts to lock the weight 53 in position in a secure and reliable manner. Forward and backward movements are prevented by the screw 43 passing through the metal strip 50 which thus in turn retains the weight in position.

Where the means for securing the balance weight are provided as a single clamp assembly, the strip would be formed with a single central perforation registering with a hole formed in the weight.

In the modified form shown in Figs. 6 to 8, the balance weight 61 includes a strip of metal 60 imbedded during the molding thereof against the face 54 remote from the rim flange, both the strip and the body of the weight being formed with corresponding offsets in a midportion of their common extent corresponding with the width of the securing means. Thus the weight is positioned in a fully reliable manner. Forward and rearward shifting of the weight are prevented by the screw 43 passing through the strip 60 and the portion 32 of the upper clamp which is in contact engagement with the metal strip in the offset portion 62.

The invention further contemplates a modification wherein the balancing weight is made of hard metal, is contoured in manufacture and is formed with two perforations for retaining it in position with respect to the clamping device.

Reference will next be made to Fig. 9 which illustrates a modified construction of the securing means. This modification is designed for use in connection with a wheel rim having a ring 70 attached over the rib 71. With such a type of rim, a single clamp 29 will suffice to secure the weight 26. The clamping action is provided by screw 42 inserted into a threaded hole 72 formed in the edge 73 of the ring 70.

Figure 10:
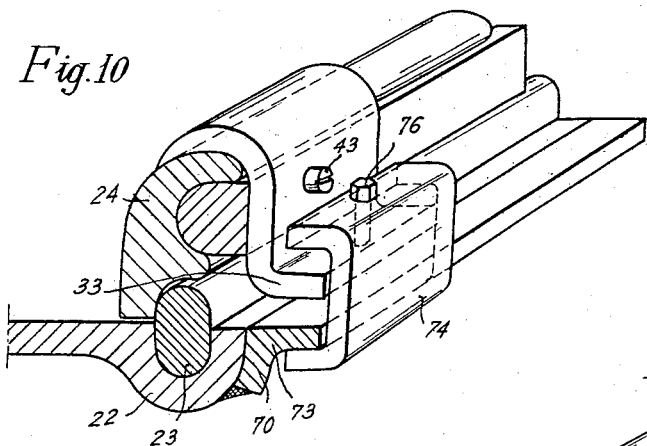
Fig. 10 is a view similar to Fig. 2 relating to another modification.

In the modification shown in Fig. 10, for use with a rim of similar type to that just mentioned, the clamping action is provided by way of an intermediate stirrup member 74 of U-shaped cross section which is mounted so that its side arms embrace respectively the edge 33 of the upper member and the edge 73 of the ring 70. The clamping action is provided by a screw 76, while screw 43 prevents displacement out of position.

Figure 11:
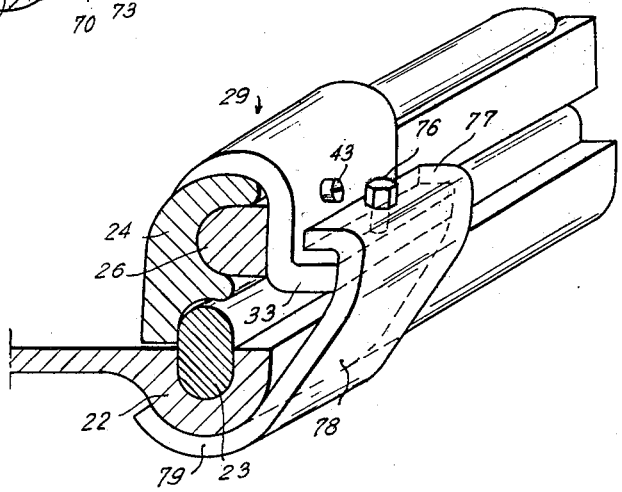
Fig. 11 is a view similar to Fig. 2 relating to another modification.

Referring now to Fig. 11, in this construction the clamp 29 is similar to the corresponding part in the foregoing embodiments. The inner or (as shown) lower clamp is formed with an edge 77 which is arranged to overlie the edge 33 of the upper clamp, and said lower clamp further includes an angularly extending portion 78 which is continued into an arcuate portion 79 conforming to the contour of rib 22. A screw 76 serves to secure the assembly in place.

In the construction shown in Fig. 12, the upper clamp 80 and lower clamp 81 are similar to the corresponding clamps in Fig. 2, but their edges are formed with outturned end parts 82 and 83 respectively, and the clamping action is effected by forcible insertion of a stirrup member 84 having inturned end portions 85 and 86 cooperating with the outturned parts 82 and 83.

In the further construction shown in Fig. 13, the assembly comprises an upper clamp 80 similar to the one last described except that its vertical extent is shorter, and a lower clamp 87 similar to that shown in Fig. 11 except that it is further formed with a downturned end portion 88 cooperating with the upturned portion 82 of the upper clamp, whereby the lower clamp 87 can be forcibly inserted to lock the assembly without requiring the use of a screw, just as in the embodiment shown in Fig. 12.

In the further modification illustrated in Fig. 14, the weight is secured by means of a single clamp member 89 by taking advantage of the inherent resiliency of the latter. The member 89 has a flat face 90 for engagement with the balance weight and a downward extension 91 conforming to the contour of the rib 22 and an upward extension 92 which is adapted to be forced past the outer border of the rim flange 24. In this construction as in those previously described, the blocking action is completed by means of a screw 43.

In the construction shown in Fig. 15, the assembly includes a lower clamp member 93 arranged to cooperate with a spline 94 provided on the rim adjacent at the junction between its main body 21 and flange 24.

The construction in Fig. 16 is very similar to that just described, except that here the upper clamp member 95 includes an inturned edge 96 adapted to extend adjacent the outturned end edge 97 of a lower clamp member 93. The screw 98 extends through the edge 97.

In the construction shown in Fig. 17, the upper clamp member 99 is formed with a rectangular slot 100 through which the outturned edge 101 of the lower clamp member 102 protrudes so that actuation of the screw 103 inserted into a threaded hole in the edge 101 acts to clamp the balance weight and apply it against the flange 24, with the tip of screw 103 acting against the edge 104 of the upper clamp member.

Advantages of the balance weight arrangement of the invention include the following features:

(1) The balance weight is firmly locked in position in the rim flange at the precise position where said weight is required;

(2) The clamping means can be applied without having to perforate the rim at any point and without having to weld thereto, thereby preserving the strength of the wheel rim unimpaired and also preserving the airtightness thereof, a feature that is of especial value in the case of tubeless tires;

(3) The assembly can be quickly and easily mounted and dismantled without special tooling;

(4) Once mounted, the assembly forms a fully unitary structure with the remainder of the wheel thereby increasing safety in service;

(5) The entire assembly is reusable. The component parts of the clamping means as well as the balance weight itself may be reused after dismantling, since they will not be subject to distortion or damage during mounting operations and during use. This is a valuable feature since every time the wheel is dismounted from the vehicle as for repair, the unbalance of the wheel assembly is modified both in angular position and in amount of bias;

(6) The assembly is adaptable to a range of wheels of different sizes, with the same components being usable owing to the possibility of varying the spacing between the upper and lower clamp members.

What I claim is:

1. An assembly for securing a balancing weight to an automotive vehicle wheel including a rim and rim flange and a rib at a junction between said rim and flange, which assembly comprises clamping means including a pair of clamping members, one of said clamping members engaging said rim flange and the other said rib for holding said weight between said clamping members, and means for forcing said clamping members toward each other.

2. An assembly as claimed in claim 1, wherein said clamping members are detachable from the wheel and so shaped that forcing of the clamping members toward each other presses said weight forcefully against the rim flange.

3. An assembly as claimed in claim 2, wherein said forcing means comprise screw-and-nut means operatively coacting with said clamping members.

4. An assembly as claimed in claim 1, wherein said weight is disposed between said rim flange and one of said clamping members in direct contact with the latter.

5. An assembly as claimed in claim 1, wherein said weight is disposed between said rim flange and one of said clamping members, and a screw extends through said one clamping member and into engagement with the surface of said weight further to lock the latter in position.

6. An assembly as claimed in claim 1, wherein said clamping members are detachable from the wheel and so shaped that forcing of the clamping members toward each other presses said weight forcefully against said rim flange, and wherein a slidable stirrup-like member overlies said clamping members for forcing the same towards each other.

7. An assembly as claimed in claim 1, wherein said clamping means comprise a clamping member having substantial resiliency for positioning the same into a position overlying said rim flange and rib.

8. An assembly as claimed in claim 1, wherein said weight is in engagement with only one of said clamping members, and wherein a screw extends through said one clamping member to engage said weight to lock the latter in said position between the clamping member, and a strip is secured to said weight, said strip having a hole therethrough through which said screw extends.

9. An assembly for balancing a motor vehicle wheel having a wheel rim mounting at its outer end a rib and an upturned rim flange, said assembly comprising a balancing mass having a surface portion matching a surface portion on said rim flange, and releasable clamping means abutting said rim and said flange in clamping engagement, said mass being held by said clamping means in a position in which said matching surface portions of the mass and the rim flange are in pressure engagement.

10. An assembly for balancing a motor vehicle having a wheel rim terminating on one side in a rib and on the other side in a rim flange, said assembly comprising a balancing mass having a surface portion matching a surface portion on said rim flange, and releasable clamping means abutting said rim and said flange in clamping engagement, said mass being held by said clamping means in a position in which said matching surface portions of the mass and the rim flange are in pressure engagement.

11. An assembly for balancing a motor vehicle wheel having a wheel rim mounting on one side a rib and on the opposite side a rim flange for supporting on one of its sides a tire wall, said assembly comprising a balancing mass having a surface portion matching a surface portion on the side of said rim flange opposite to that for supporting a tire wall, said mass abutting with its matching surface portion against the matching surface portion of the rim flange, a first clamping member straddling said rim flange and abutting against said mass on the side thereof opposite said matching surface portion for holding the mass in position, a second clamping member straddling said rib, and clamp tightening means engaging said clamping members for urging the same toward each other thereby pressing said mass against said rim flange.

12. An assembly according to claim 11, and comprising a screw bolt threaded through one of said clamping members for turning said bolt into pressure engagement with said mass.

13. An assembly for balancing a motor vehicle wheel having a wheel rim mounting on one side a rib and on the opposite side a rim flange for supporting on one of its sides a tire wall, said assembly comprising a balancing mass having a surface portion matching a surface portion on the side of said rim flange opposite to that for supporting a tire wall, said mass abutting with its matching surface portion against the matching surface portion of the rim flange, a first clamping member straddling said rim flange and abutting against said mass on the side thereof opposite said matching surface portion for holding the mass in position, a second clamping member straddling said rib, clamp tightening means engaging said clamping members for urging the same toward each other thereby pressing said mass against said rim flange, a metal strap reinforcing said mass on the side thereof opposite said matching surface portion, said strap having a hole therethrough, and a screw bolt threaded through said strap hole and said first clamping member for turning said bolt into pressure contact with said mass thereby locking the same in position.

14. An assembly for balancing a motor vehicle wheel having a wheel rim terminating on one side in an upturned rim flange and on the opposite side in a rib having a flattened surface portion, said assembly comprising a balancing mass having a surface portion matching a surface portion of said rim flange, clamping means for holding said mass in a position in which said matching surface portions abut against each other, said clamping means including a portion abutting against the mass of a side thereof opposite said matching surface portion and a portion abutting against said flattened surface portion of the rib, and clamp tightening means engaging said clamping means for forcing said abutting portions thereof toward each other thereby pressing the mass against the rim flange.

15. An assembly for balancing a motor vehicle wheel having a wheel rim mounting at its free end on one side a rib and on the opposite side an upturned rim flange for supporting on one of its sides a tire wall, said assembly comprising a balancing mass having a surface portion abutting against a matching surface portion on an opposite side of said rim flange, and a stirrup shaped member straddling with its ends said rib and said rim flange and abutting with its middle portion against the side of the mass opposite to said matching portion thereof abutting against the rib flange for locking the mass in position.

16. An assembly according to claim 15 and further comprising a threaded bolt threaded through the middle portion of said stirrup shaped member for engaging said mass further to lock the same in position.

References Cited in the file of this patent

UNITED STATES PATENTS

| | | |
|---|---|---|
| 670,904 | Pittman | Mar. 26, 1901 |
| 1,800,883 | Booth | Apr. 14, 1931 |
| 2,029,561 | Du Sang | Feb. 4, 1936 |
| 2,700,999 | Lemmerz | Feb. 1, 1955 |